US012680507B2

(12) United States Patent
Baddam et al.

(10) Patent No.: US 12,680,507 B2
(45) Date of Patent: Jul. 14, 2026

(54) AIR TURBINE STARTERS AND SYSTEMS FOR GAS TURBINE ENGINES

(71) Applicant: Unison Industries, LLC, Jacksonville, FL (US)

(72) Inventors: Nagendra Baddam, Bengaluru (IN); Shiloh Montegomery Meyers, Miamisburg, OH (US)

(73) Assignee: Unison Industries, LLC, Jacksonville, FL (US)

( * ) Notice: Subject to any disclaimer, the term of this patent is extended or adjusted under 35 U.S.C. 154(b) by 6 days.

(21) Appl. No.: 18/978,295

(22) Filed: Dec. 12, 2024

(65) Prior Publication Data

US 2026/0168444 A1 Jun. 18, 2026

(51) Int. Cl.
| | |
|---|---|
| *F02C 7/277* | (2006.01) |
| *F02N 11/00* | (2006.01) |
| *H02K 7/118* | (2006.01) |
| *H02K 7/18* | (2006.01) |

(52) U.S. Cl.
CPC .............. *F02C 7/277* (2013.01); *F02N 11/00* (2013.01); *H02K 7/1185* (2013.01); *H02K 7/1823* (2013.01); *F05D 2220/76* (2013.01)

(58) Field of Classification Search
CPC ...... F02C 7/277; F02C 7/27; F02N 11/00–14; F02N 9/04; F02N 13/00–02; F02N 7/08; F02N 7/12; F01D 15/10; F01D 25/36; F05D 2220/76
See application file for complete search history.

(56) References Cited

U.S. PATENT DOCUMENTS

| | | | |
|---|---|---|---|
| 4,358,051 A | 11/1982 | Hunt | |
| 10,100,733 B2 | 10/2018 | O'Toole | |
| 10,266,276 B2 | 4/2019 | Beuning | |
| 10,982,594 B2 | 4/2021 | Army | |
| 11,067,001 B2 | 7/2021 | Fontalbat | |
| 11,333,073 B2 | 5/2022 | Kawai | |
| 11,454,172 B2 * | 9/2022 | Sridharan | ................. F02C 7/26 |
| 11,536,198 B2 | 12/2022 | Millhaem | |

(Continued)

FOREIGN PATENT DOCUMENTS

| | | |
|---|---|---|
| EP | 3667044 A1 | 6/2020 |
| WO | 2023194665 A1 | 10/2023 |

OTHER PUBLICATIONS

FAA-H-8083-32B, Chapter 5: Engine Starting Systems, Jul. 13, 2023, FAA (Year: 2023).*

*Primary Examiner* — Stephanie Sebasco Cheng
(74) *Attorney, Agent, or Firm* — McGarry Bair PC

(57) ABSTRACT

A system including an air turbine starter having a housing defining an air flow path between an inlet and an outlet. A turbine shaft located in the housing and a plurality of blades coupled to the turbine shaft and disposed in the primary air flow path. An electric motor within the housing, and an outer surface of the electric motor defining a portion of the primary air flow path, the electric motor having a drive shaft. A clutch assembly within the housing to selectively couple the electric machine drive shaft and the turbine shaft. Further, a valve to, when opened, fluidly couple an ambient air supply to the inlet and a controller to, when the electric motor is activated, open the valve to enable ambient air to flow through the primary air flow path and over the outer surface of the electric motor.

20 Claims, 4 Drawing Sheets

(56)         References Cited

U.S. PATENT DOCUMENTS

| | | | |
|---|---|---|---|
| 12,040,730 B2 | 7/2024 | Rafferty | |
| 2014/0252769 A1* | 9/2014 | Menheere | H02K 7/1823 |
| | | | 415/124.2 |
| 2017/0362999 A1* | 12/2017 | Abe | F02C 7/32 |
| 2018/0030900 A1* | 2/2018 | Mathis | F02C 7/277 |

* cited by examiner

AIR TURBINE STARTERS AND SYSTEMS FOR GAS TURBINE ENGINES

TECHNICAL FIELD

The disclosure generally relates to starters for gas turbine engines, more specifically, hybrid air turbine starters and related systems for gas turbine engines.

BACKGROUND

A turbine engine, for example a gas turbine engine, is typically started via an air turbine starter (ATS). The ATS is often mounted near the turbine engine and the ATS can be coupled to a high-pressure fluid source, such as compressed air, which impinges upon a turbine rotor in the ATS causing the turbine rotor to rotate at a relatively high rate of speed. The ATS includes an output drive shaft that is driven by the turbine rotor, typically through a reducing gearbox, where the output drive shaft provides rotational energy to a rotatable element of the turbine engine (e.g., the crankshaft or the rotatable shaft) to begin rotating. The rotation by the ATS continues until the turbine engine attains a self-sustaining operating rotational speed.

DETAILED DESCRIPTION

Figure 1:
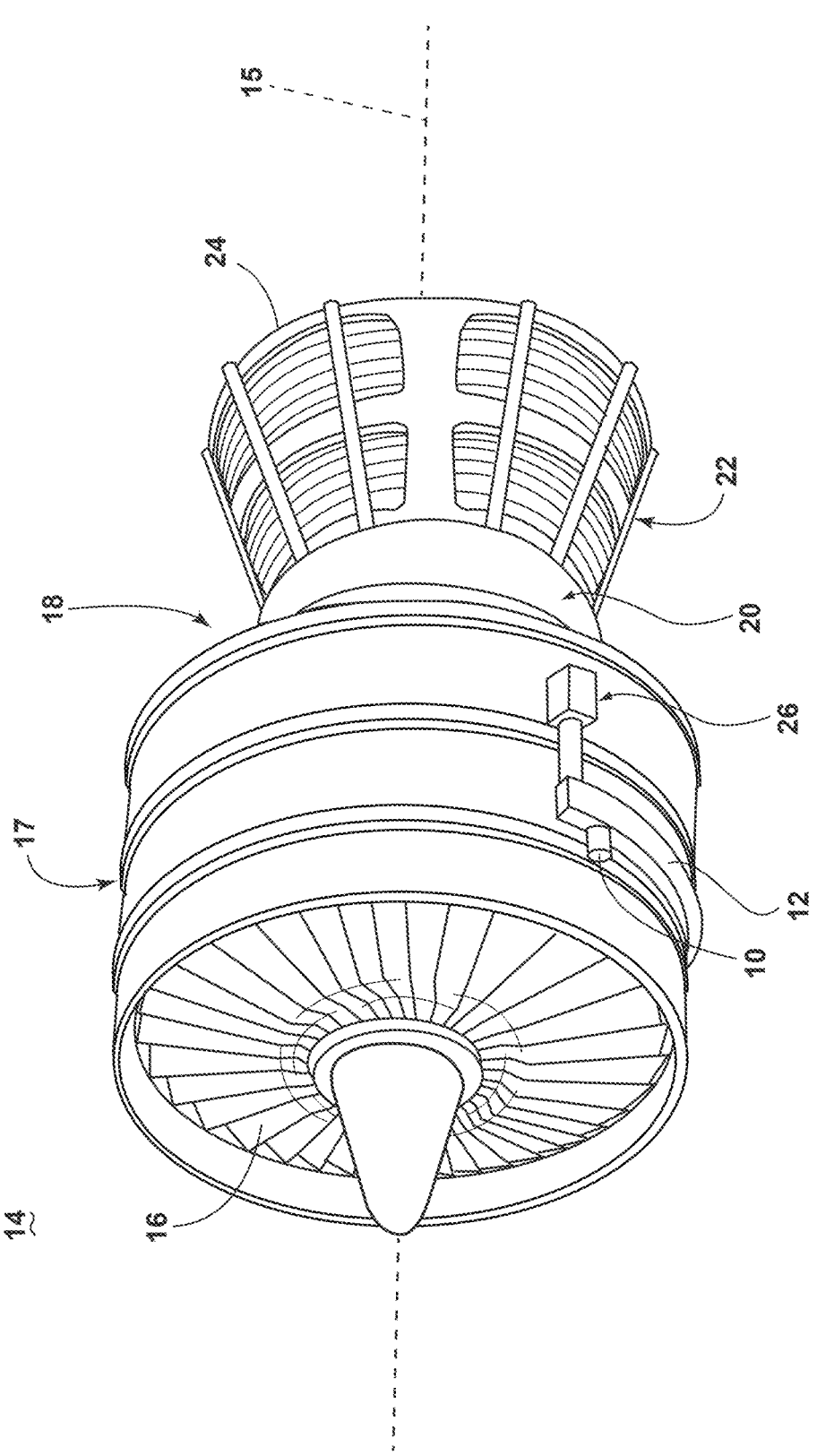
FIG. 1 is a schematic illustration of a turbine engine with a hybrid air turbine starter, in accordance with various aspects described herein.

In one aspect, the disclosure relates to a system including an air turbine starter with an electric machine and a controller with at least one valve. The system includes an ambient air supply, pressurized air supply, and a bleed air supply. Each air supply is selectively fluidly coupled to an inlet of the air turbine starter via a respective ambient air valve, pressurized air valve, and bleed air valve. The air turbine starter includes a housing with the inlet and an outlet that encases or otherwise surrounds the electric machine and a turbine shaft. The housing can be unitarily formed or include multiple components coupled together. The housing of the air turbine start partially defines a primary air flow path. The air turbine starter can be operated in a pneumatic/air-powered mode or an electric mode.

In the air-powered mode, a pressurized air valve is opened to enable high pressure air to flow through the primary air flow path, which causes the turbine shaft to rotate and therefore start the engine. Additionally, or alternatively, the bleed air valve can be opened to provide high pressure air to flow through the primary air flow path to rotate the turbine shaft start the engine.

In the electric mode, the electric machine is activated to rotate the turbine shaft, and an ambient air valve is opened. The rotation of the turbine shaft can be used to start the engine or rotate parts of the engine (e.g., maintenance). The rotation of the turbine shaft, when the ambient air valve is open, draws ambient air into the primary air flow path, which cools the electric machine. That is, while the air turbine starter is operating in the electric mode, the ambient air valve is opened to enable ambient air to flow through the primary air flow path and along the outer surface of the electric machine to help cool the electric machine.

While in some examples the disclosure is described in connection with turbine engines for an aircraft, this disclosure is applicable to other non-aircraft applications or other turbine environments. Non-limiting examples of where this disclosure can be applied include other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms such as "first", "second", etc. may be used interchangeably to distinguish one component from another and are not intended to signify location or importance of the individual components.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, a "controller" or "controller module" can include a component configured or adapted to provide instruction, control, operation, or any form of communication for operable components to effect the operation thereof. A controller or controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller or controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller or controller module can also include a data storage component accessible by the processor, including memory, whether transient, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein.

Additionally, as used herein, elements being "electrically connected," "electrically coupled," or "in signal communication" can include an electric transmission or signal being sent, received, or communicated to or from such connected or coupled elements. Furthermore, such electrical connections or couplings can include a wired or wireless connection, or a combination thereof.

As used herein, "hybrid turbine starter (HTS)" refers to an air turbine starter having a turbine member selectively operably coupled to an electric machine. A housing, which can be several components coupled together, encases or surrounds at least a portion of the electric machine and the turbine member of the air turbine starter. The HTS can be a hybrid pneumatic electric starter (HPES), where the turbine member is driven by pressurized air (pneumatically) or by electrical energy.

FIG. 1 is a schematic view of a turbine engine 14 having an air turbine starter (ATS) illustrated as the hybrid turbine starter 10 (HTS). The HTS 10 is coupled to an accessory gear box (AGB) 12, which are both schematically illustrated as being mounted to a turbine engine 14 such as a gas turbine engine. The turbine engine 14 defines an engine centerline 15 extending in an axial direction.

The turbine engine 14 includes an air intake with a fan 16 that supplies air to a high pressure compression section 18. While illustrated by way of example at a radially outer portion of a fan casing 17, it is contemplated that the HTS 10 can couple to any portion of the turbine engine 14. By way of non-limiting example, the HTS 10 can be located radially inward if the fan casing 17 and/or shifted in an axial direction.

The air intake with the fan 16 and the high pressure compression section 18 collectively are known as the "cold section" of the turbine engine 14 upstream of the combustion. The high pressure compression section 18 provides a combustion section 20 with high pressure air. In the combustion section 20, the high pressure air is mixed with fuel and combusted. Hot and pressurized combustion gases pass through a high pressure turbine section 22 and a low pressure turbine section 24 before exhausting from the turbine engine 14. As the combustion gases pass through the high pressure turbine section 22 and the low pressure turbine section 24, rotational energy is extracted from the flow of the gases passing through the turbine engine 14. A shaft can connect the high pressure turbine region 22 to the high pressure compression section 18 to power the compression mechanism. The low pressure turbine section 24 can be coupled to the fan 16 of the air intake by way of a shaft to power the fan 16. That is, the turbine engine 14 includes an engine core having a compression section 18, combustion section 20, and turbine sections 22, 24 in serial flow arrangement, the engine core having an engine drive shaft.

The AGB 12 is coupled to the turbine engine 14 at either the high pressure turbine region 22 or the low pressure turbine region 24. The coupling between the AGB 12 and the turbine engine can be, for example, by way of a mechanical power take-off 26. The mechanical power take-off 26 contains multiple gears and components for mechanical coupling of the AGB 12 to the turbine engine 14. Under normal operating conditions, the power take-off 26 translates power from the turbine engine 14 to the AGB 12 to power accessories of the aircraft for example but not limited to fuel pumps, electrical systems, and cabin environment controls. The HTS 10 can be mounted on the outside of either the air intake region containing the fan 16 or on the core near the high-pressure compression region 18.

Figure 2:
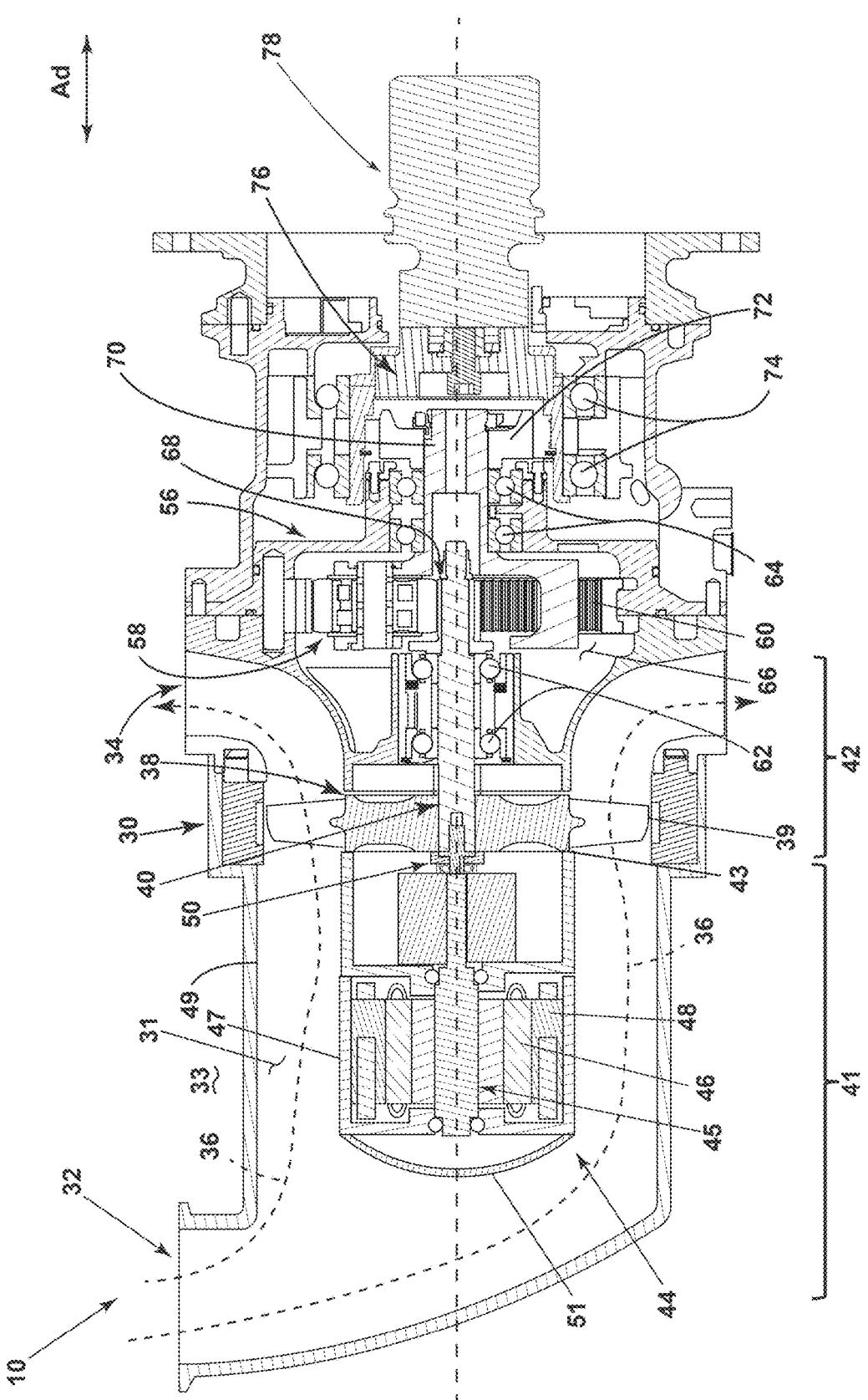
FIG. 2 is a cross-sectional view of the hybrid air turbine starter of FIG. 1, in accordance with the various aspects described herein.

FIG. 2 is a schematic cross section of an exemplary HTS 10 that can, for example, be included in the embodiment of FIG. 1. The HTS 10 includes a housing 30 defining an interior 31 and an exterior 33. The housing 30 includes an inlet 32 and an outlet 34. A primary air flow path 36 extends between the inlet 32 and outlet 34 for communicating a flow of fluid therethrough. In one non-limiting example the fluid is air, such as pressurized air, that is provided from a pressurized air supply, including but not limited to, a ground-operating air cart, an auxiliary power unit, or a cross-bleed start from an engine already operating. The HTS 10 includes a turbine member 38 journaled within the housing 30. A plurality of blades 39 extend from and are circumferentially spaced about the turbine member 38. The plurality of blades 39 are disposed within the primary air flow path 36.

A turbine shaft 40 is coupled to the turbine member 38. The turbine shaft 40 can rotatably extract mechanical power from the flow of gas along the primary air flow path 36 via the plurality of blades 39, which thereby rotates the turbine shaft 40.

It is important to note that the HTS 10 is functionally and structurally different than the turbine engine 14 (FIG. 1). The HTS 10 is provided with a compressed air source to rotate the turbine member 38. The rotating of the turbine member 38 and turbine shaft 40 of the HTS 10 is used to start the turbine engine 14. Other than compressed air, the turbine member 38 can also be rotated by an electric machine operably coupled and housed in the HTS 10 with the turbine shaft 40. The turbine engine 14 further distinguishes from the HTS 10 as the turbine engine 14 uses the Brayton cycle (or Joule cycle), which involves intake, compression, combustion, and exhaust. The operating environment, requirements, structure, and function of the HTS 10 and the turbine engine 14 differ significantly.

The primary air flow path 36 has at least a first portion 41 and a second portion 42. The first portion 41 is defined from the inlet 32 to an upstream face 43 of the turbine member 38.

The second portion 42 is defined from the upstream face 43 of the turbine member 38 to the outlet 34.

A gear train 58 can be located within a gear box 56 and drivingly coupled with the turbine member 38. In the illustrated example, the gear train 58 includes a ring gear 60. It will be understood that the gear train 58 can include any suitable gear assembly including, but not limited to, a planetary gear assembly, a pinion gear assembly, or the like. The rotatable turbine shaft 40 couples the gear train 58 to the plurality of blades 39 allowing for the transfer of mechanical power to the gear train 58. The rotatable turbine shaft 40 is coupled to the gear train 58 and rotatably supported by a pair of turbine bearings 62. The gear train 58 is supported by a pair of carrier bearings 64.

A gear box interior 66 can be provided for containing a lubricant, including, but not limited to, grease or oil. The gear box interior 66 can provide lubrication and cooling to mechanical parts contained therein, such as the gear train 58, ring gear 60, turbine bearings 62, carrier bearings 64, or the like.

An aperture 68 is provided in the gear box 66. The rotatable turbine shaft 40 can extend through the aperture 68 and mesh with a carrier shaft 70 to which a clutch 72 is mounted and supported by a pair of spaced bearings 74. A drive shaft 76 extends from the gear box 56 and is coupled to the clutch 72 and additionally supported by the pair of spaced bearings 74. The drive shaft 76 is driven by the gear train 58 to selectively couple to an output shaft 78 such that during a starting operation the drive shaft 76 provides a driving motion to the output shaft 78.

An electric machine is located within the housing 30. In the non-limiting example shown, the electric machine is an electric motor 44. However, it is contemplated in a non-limiting example, that the electric machine can include an electric generator. The electric motor 44 is axially forward of the turbine member 38. That is, the turbine member 38 is axially aft of the electric motor 44. As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream. The term "axially" refers to an axial direction Ad along the engine centerline 15.

The electric motor 44 can include an electric machine drive shaft 45. The electric motor 44 can include a rotor 46 rotatably connected with the electric machine drive shaft 45 and configured to rotate relative to a stationary (i.e. non-rotating) stator 48. By way of non-limiting example, the rotor 46 can be an inner rotor. An outer surface 47 circumscribes the electric motor 44. The outer surface 47 of the electric motor 44 is spaced from an inner surface 49 of the housing 30. The outer surface 47 defines at least a portion of the primary air flow path 36. In a non-limiting example, the HTS 10 includes a dome wall 51 in the interior 31 of the housing 30 . . . . The dome wall 51 can guide air from the inlet 32 to the turbine member 38 by defining at least a portion of a primary air flow path 36. That is, the dome wall 51 can create a smooth flow path around the electric motor 44. It is contemplated in another non-limiting example, the dome wall 51 can be included on electrical machine.

The electric motor 44 can be provided with electrical energy, resulting in the rotation of the rotor 46 and the electric machine drive shaft 45. The electric motor 44 can receive electrical energy, for example, from a power distribution system or an electrical storage device (e.g., battery).

Optionally, electrical energy (e.g., electricity, current, voltage, power, or the like) can be supplied from the HTS 10 to another component, such as the power distribution system, electrical storage device, or an electrical load.

That is, the electric machine drive shaft 45 can be adapted or operable to receive a rotatable kinetic input or supply or provide a rotatable kinetic output.

A clutch assembly 50 is located in the interior 31. The clutch assembly 50 selectively couples the rotatable turbine shaft 40 to the electric machine drive shaft 45. The clutch assembly 50 can be mounted to the electric machine drive shaft 45. It is contemplated that the clutch assembly 50 is axially located between the electric motor 44 and the turbine member 38. However, the clutch assembly 50 can axially overlap or be located radially outward of the electric motor 44 and the turbine member 38. It is further contemplated that the clutch assembly 50 can be included in the electric motor 44. It is yet further contemplated that portions of the electric motor 44 are included in the clutch assembly 50.

Figure 3:
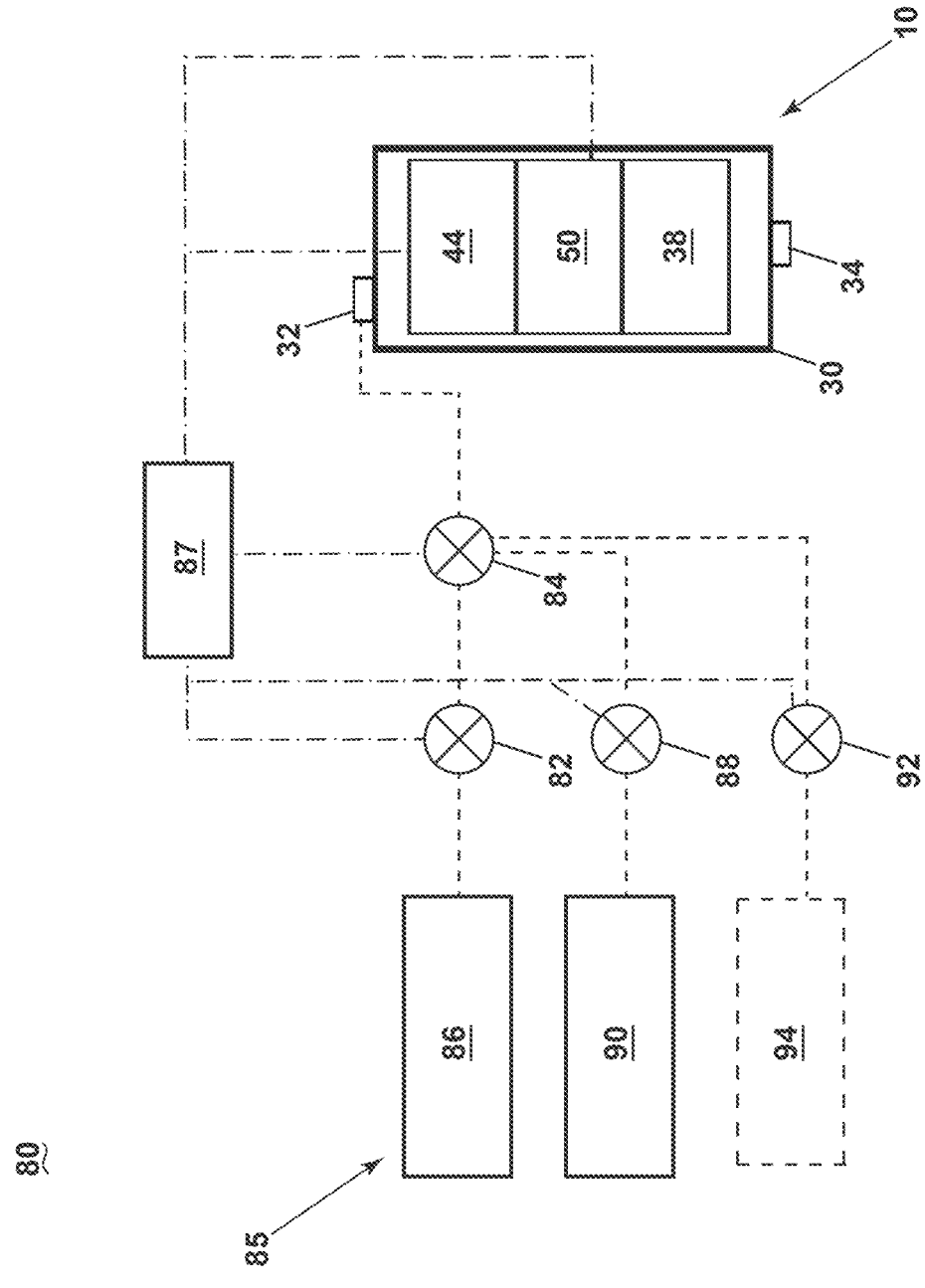
FIG. 3 is a schematic diagram illustrating electronic and fluid communication of the hybrid air turbine starter of FIG. 2, in accordance with various aspects described herein.

FIG. 3 is a schematic diagram illustrating a system 80 for the HTS 10. A starter air valve (SAV) 84 selectively couples the inlet 32 of the HTS 10 to an air supply 85. The air supply 85 can include an ambient air supply 86 having an ambient air valve 82 and a pressurized air supply 90 having a pressurized air valve 88. Optionally, the air supply 85 can further include a bleed air supply 94 having a bleed valve 92. That is, each portion of the air supply 85 can include a valve, illustrated as the ambient air valve 82, the pressurized air valve 88, and the bleed valve 92 that is upstream of the SAV 84. The dashed-lines lines shown, for example, between the ambient air supply 86, the ambient air valve 82, the SAV 84, and the inlet 32 represent air flow lines. Similar dashed-lines shown also represent air flow lines.

A controller 87 can be in communication with the SAV 84, the ambient air valve 82, and the pressurized air valve 88. The controller 87 can also be in communication with the bleed valve 92. In other words, the controller 87 is configured to actuate the SAV 84, the ambient air valve 82, and the pressurized air valve 88 between open and closed positions.

Further, the controller 87 can also be in communication with the HTS 10. Specifically, the controller 87 can at least selectively actuate the electric motor 44 and the clutch assembly 50. In other words, the controller 87 can control electrical energy to the electric motor 44. The controller 87 can also control the clutch assembly 50 to selectively couple or uncouple the electric machine drive shaft 45 (FIG. 2) of the electric motor 44 and the turbine shaft 40 (FIG. 2) rotatably coupled to the turbine member 38. The dot-dash lines shown between the controller 87, the ambient air valve 82, the SAV 84, the bleed valve 92, the electric machine 44, and the clutch assembly 50 represent the electrical connection thereof.

During start up of the turbine engine 14 (FIG. 1), the controller 87 opens the starter air valve (SAV) 84 and the pressurized air valve 88 to fluidly couple the inlet 32 of the HTS 10 to the pressurized air supply 90. The pressurized air supply 90, can include, but not limited to, a ground-operating air cart, an auxiliary power unit, or a cross-bleed start from an engine already operating. Pressurized air from the pressurized air supply 90 is received at the inlet 32 and flows through the primary air flow path 36 (FIG. 2) to rotate the turbine member 38. The turbine member 38 can be selectively coupled to one or more portions of the turbine engine 14 (FIG. 1) for starting the turbine engine 14.

During one or more other portions of the cycle of operation of the turbine engine (14), including a maintenance cycle, the controller 87 can provide electrical energy to the electric motor 44 and operably couple the electric motor 44 to the turbine member 38 by engaging the clutch assembly 50. The controller 87 can also open the SAV 84 and the ambient air valve 82 to fluidly couple the inlet 32 of the housing 30 of the HTS 10 and the ambient air supply 86. The ambient air supply 86 can include ambient air at atmospheric pressure. In a non-limiting example, ambient air can be air from other portions of the engine 10 outside of the engine core. The rotation of the turbine member 38 by the electric motor 44 draws ambient air into the inlet 32 of the HTS 10. The ambient air drawn in by the turbine member 38 flows through the primary air flow path 36 (FIG. 2) defined, in part, by the electric motor 44. The flow of the ambient air through the primary air flow path 36 (FIG. 2) from the inlet 32 to the outlet 34 cools the electric motor 44.

Optionally, the bleed air supply 94 can be fluidly coupled to the inlet 32 of the HTS 10 via the SAV 84 and the bleed valve 92. The bleed air provided by the bleed air supply 94 can be used to cool the electric motor 44, assist in rotation the turbine member 38, or any combination thereof. In a non-limiting example, bleed air from the bleed air supply 94 can include bleed air from another portion of the turbine engine 14 (FIG. 1).

Figure 4:
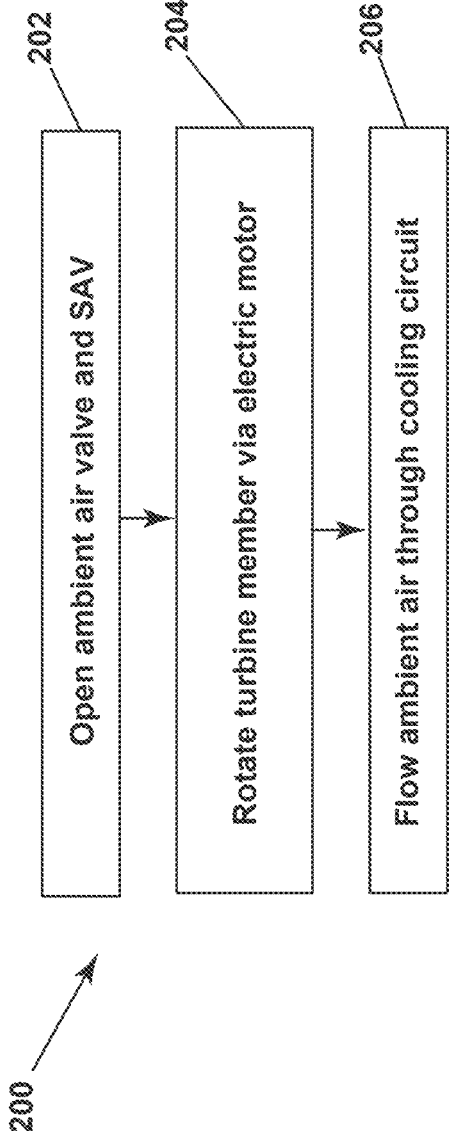
FIG. 4 is a schematic flowchart of exemplary steps of a method for operating the hybrid air turbine starter of FIG. 3.

FIG. 4 is a flowchart of a method 200 of operation of a cooling circuit for the electric motor 44 of the HTS 10. The cooling circuit is in thermal communication with the electric motor 44. The cooling circuit can include the ambient air supply 86, the ambient air valve 82, the SAV 84, and the primary air flow path 36 defined between the inlet 32 and the out 34 of the housing 30. At 202, the ambient air valve 82 and the SAV 84 are actuated or moved from a closed position to an open position. As used herein, the term "open position" can be a partially open position or a fully open position. The actuation or opening/closing of the ambient air valve 82 and the SAV 84 can be determined by the controller 87.

At 204, the turbine member 38 is rotated by the electric motor 44. That is, the clutch assembly 50 operably and selectively couples the electric machine drive shaft 45 and the turbine shaft 40 to rotate the turbine member 38 via the electric motor 44. For example, the controller 87 supplies power to the electric motor 44 which rotates the electric machine drive shaft 45. The clutch assembly 50, when engaged by the controller 87, operably rotatably couples the electric machine drive shaft 45 and the turbine shaft 40 of the turbine member 38. The rotation of the turbine shaft 40 can be used to start the turbine engine 14 or rotate parts of the turbine engine 14.

At 206, ambient air is drawn through the cooling circuit. That is, ambient air from the ambient air supply 86 passes through the ambient air valve 82, the SAV 84 and the inlet 32 of the HTS 10 to flow through the primary air flow path 36 to the outlet 34. The plurality of blades 39 rotated by the electric machine drive shaft 45 draw the ambient air from the ambient air supply into the primary air flow path 36. When the ambient air flows through the primary air flow path 36 partially defined by the electric motor 44, the ambient air defines a cooling air flow for the electric motor 44 as it passes over the outer surface 47 of the electric motor 44.

In various embodiments of the method 200, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

Optionally, the bleed air valve 92 can be closed or open during the method 200.

During the method 200, the pressurized valve 82 is in the closed position. Optionally, prior to the method 200, the pressurized valve 82 can be moved by the controller 87 to the closed position.

Benefits associated with aspects of the disclosure herein include a hybrid air turbine starter with the ability to route air supplied to the HTS through a cooling circuit to cool the electric motor during operation. This allows the length of the electric motor to be shortened while simultaneously achieving electric motor cooling. Furthermore, the cooling circuit design provides a reduced overall part weight and size. A benefit of the electric motor of the HTS is that the electric motor can be utilized for rotating the turbine shaft to start the engine or rotating and maintaining other parts of the engine.

Additionally, by cooling the electric motor during operation via the cooling circuit, the electric motor can be configured to operate for longer periods of time before pausing operation to cool down. This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses: An air turbine starter comprising: a housing defining an interior; a turbine member having a plurality of blades located within the interior of the housing, wherein the turbine member rotatable couples to a turbine shaft; an electric machine within the interior of the housing and having an electric machine drive shaft; a clutch assembly within the interior of the housing and selectively coupling the turbine shaft to the electric machine drive shaft; and an air supply fluidly coupled to a primary air flow path passing through over the plurality of blades and a cooling circuit in thermal communication with the electric machine.

A system comprising: an air turbine starter including: an housing defining an air flow path between an inlet and an outlet; a turbine shaft in the housing; a plurality of blades coupled to the turbine shaft and disposed in the primary air flow path; an electric motor within the housing, an outer surface of the electric motor defining a portion of the primary air flow path, the electric motor having a drive shaft; a clutch assembly within the housing to selectively couple the drive shaft and the turbine shaft; a valve to, when opened, fluidly couple an ambient air supply to the inlet; and a controller to, when the electric motor is activated, open the valve to enable ambient air to flow through the primary air flow path and over the outer surface of the electric motor.

The system of any preceding clause, wherein the air supply is an ambient air supply and the cooling circuit includes an ambient air valve, a starter air valve, and the primary air flow path.

The system of any preceding clause, wherein an outer surface of the electric motor defines at least a portion of the primary air flow path.

The system of any preceding clause, further comprising a controller operatively coupled to the starter air valve, the ambient air valve, and a pressurized air valve, wherein the controller is configured to actuate the starter air valve, the ambient air valve, and the pressurized air valve between an open position and a closed position.

The system of any preceding clause, wherein the starter air valve and the ambient air valve are located upstream of an inlet of the primary air flow path.

A system comprising an air turbine starter comprising a housing defining an interior and an exterior; an electric motor having an electric machine drive shaft, wherein the electric motor is located at the interior of the housing, and wherein the electric motor includes an outer surface spaced from an inner surface of the housing; a turbine member located axially aft of the electric motor having a plurality of blades, wherein the turbine member is coupled to a turbine shaft; a clutch assembly selectively coupling the electric machine drive shaft and turbine shaft; and a primary air flow path coupling an inlet and an outlet, wherein the primary air flow path, the inlet, and the outlet are defined by at least a portion of the housing, and wherein at least a portion of the primary air flow path is further defined by the outer surface of the electric motor.

The system of any preceding clause, further comprising an ambient air valve and a starter air valve located at the exterior of the housing, wherein the ambient air valve and the starter air valve selectively fluidly couple the inlet and an ambient air supply.

The system of any preceding clause, further comprising a controller in communication with the starter air valve and the ambient air valve, wherein the controller actuates the starter air valve and the ambient air valve between an open position and a closed position.

The system of any preceding clause, wherein when the controller is in communication with the clutch assembly to selectively couple the electric machine drive shaft and the turbine shaft, and wherein the controller is configured to control electrical energy to the electric motor.

The system of any preceding clause, wherein the primary air flow path has a first portion and a second portion, wherein the first portion is defined from a inlet to an upstream face of the turbine member, and the second portion is defined from the upstream face of the turbine member to an outlet.

The system of any preceding clause, wherein the turbine shaft and the electric machine drive shaft are axially spaced.

A turbine engine comprising: an engine core having a compression section, combustion section, and turbine in serial flow arrangement, the engine core having an engine drive shaft; and a system, the system comprising: an air turbine starter, the air turbine starter comprising: a housing defining an interior; a turbine located within the interior and having a turbine shaft and a plurality of blades couple to the turbine shaft; an electric machine within the interior and having an electric machine drive shaft; a clutch assembly within the interior and selectively coupling the turbine shaft to the machine shaft; and an air supply fluidly coupled to a primary air flow path passing through over the plurality of blades and a cooling circuit in thermal communication with the electric machine; a valve selectively fluidly coupled to the inlet; and a controller operatively coupled to the valve.

The system of any preceding clause, wherein the valve is an ambient air valve, the system further including a pressurized air valve to, when opened, fluidly couple a pressurized air supply to the inlet, the system further including an air starter valve between the ambient air valve, the pressurized air valve, and the inlet.

The turbine engine of any preceding clause, wherein an outer surface of the electric machine defines at least a portion of the primary air flow path.

The turbine engine of any preceding clause, wherein the valve is an ambient air valve, the system further including a pressurized air valve to, when opened, fluidly couple a pressurized air supply to the inlet, the system further including an air starter valve between the ambient air valve, the pressurized air valve, and the inlet.

The turbine engine of any preceding clause, wherein the controller is operatively coupled to the starter air valve and the ambient air valve, wherein the controller is configured to actuate the starter air valve and the ambient air valve between an open position and a closed position.

The turbine engine of any preceding clause, wherein the starter air valve and the ambient air valve are located upstream of the inlet.

The turbine engine of any preceding clause, further comprising a starter air valve, an ambient air valve, and a pressurized air valve upstream of the inlet, wherein the pressurized air valve and the starter air valve fluidly couple the inlet and a pressurized air supply, and the ambient air valve and the starter air valve fluidly couple the inlet and an ambient air supply.

The turbine engine of any preceding clause, wherein the turbine shaft and the electric machine drive shaft are axially spaced.

The turbine engine of any preceding clause, wherein the clutch assembly is axially located between the turbine shaft and the electric machine drive shaft.

The turbine engine of any preceding clause, wherein the air turbine starter further comprises an output shaft coupled to the turbine shaft, wherein the output shaft is selectively coupled to the engine drive shaft.

A method of cooling an electric motor of an air turbine starter of a turbine engine, the method comprising: opening an ambient air valve and a starter air valve to fluidly couple an ambient air supply to an inlet of the air turbine starter; rotating a turbine member of the air turbine starter by clutching a turbine shaft of the turbine member to an electric machine drive shaft of the electric motor; and flowing ambient air through a primary air flow path at least partially defined by an outer surface of the electric motor and a housing of the air turbine starter.

The method of any preceding clause, wherein the electric motor and the turbine member are located at an interior of the housing of the air turbine starter.

The method of any preceding clause, further comprising closing a pressurized air valve.

The method of any preceding clause, wherein a controller actuates the opening of the ambient air valve, the starter air valve, and rotation of the electric motor to rotate the electric machine drive shaft.

The method of any preceding clause, wherein the controller actuates a clutch assembly axially located between the electric motor and the turbine member to operably selectively couple the turbine shaft to the electric machine drive shaft.

The turbine engine of any preceding clause, wherein the electric motor defines a portion of the clutch assembly.

The turbine engine of any preceding clause, wherein the clutch assembly is included in the electric motor.

The turbine engine of any preceding clause, wherein a dome wall is disposed in the interior, wherein the dome wall is configured to guide air from the inlet to the turbine member.

What is claimed is:
1. A system comprising:
an air turbine starter including:

a housing defining a primary air flow path between an inlet and an outlet;

a turbine shaft in the housing;

a plurality of blades coupled to the turbine shaft and disposed in the primary air flow path;

an electric motor within the housing, an outer surface of the electric motor defining a portion of the primary air flow path, the electric motor having an electric machine drive shaft;

a clutch assembly within the housing to selectively couple the electric machine drive shaft and the turbine shaft;

a valve to, when opened, fluidly couple an ambient air supply to the inlet; and a controller to, when the electric motor is activated, open the valve to enable ambient air to flow through the primary air flow path and over the outer surface of the electric motor.

2. The system of claim 1, wherein the valve is an ambient air valve, the system further including a pressurized air valve to, when opened, fluidly couple a pressurized air supply to the inlet, the system further including a starter air valve between the inlet and both of the ambient air valve and the pressurized air valve.

3. The system of claim 2, wherein the controller is operatively coupled to the starter air valve, the ambient air valve, and the pressurized air valve, wherein the controller is configured to actuate each of the starter air valve, the ambient air valve, and the pressurized air valve between a respective open position and a respective closed position.

4. The system of claim 1, wherein the turbine shaft and the electric machine drive shaft are axially spaced.

5. The system of claim 4, wherein the clutch assembly is axially located between the turbine shaft and the electric machine drive shaft.

6. A system comprising:

an air turbine starter comprising:

a housing defining an interior and an exterior;

an electric motor having an electric machine drive shaft, wherein the electric motor is located at the interior of the housing, and wherein the electric motor includes an outer surface spaced from an inner surface of the housing;

a turbine member located axially aft of the electric motor having a plurality of blades, wherein the turbine member is coupled to a turbine shaft;

a clutch assembly selectively coupling the electric machine drive shaft and the turbine shaft; and a primary air flow path coupling an inlet and an outlet, wherein the primary air flow path, the inlet, and the outlet are defined by at least a portion of the housing, and wherein at least a portion of the primary air flow path is further defined by the outer surface of the electric motor;

a valve selectively fluidly coupled to the inlet; and a controller operatively coupled to the valve.

7. The system of claim 6, wherein the valve is an ambient air valve, the system further including a pressurized air valve to, when opened, fluidly couple a pressurized air supply to the inlet, the system further including a starter air valve between the inlet and both of the ambient air valve and the pressurized air valve.

8. The system of claim 7, wherein the controller is operatively coupled to the starter air valve, the ambient air valve, and the pressurized air valve, wherein the controller is configured to actuate each of the starter air valve, the ambient air valve, and the pressurized air valve between a respective open position and a respective closed position.

9. The system of claim 8, wherein the controller is in communication with the clutch assembly to selectively couple the electric machine drive shaft and the turbine shaft, and wherein the controller is configured to control electrical energy to the electric motor.

10. The system of claim 6, wherein the primary air flow path has a first portion and a second portion, wherein the first portion is defined from the inlet to an upstream face of the turbine member, and the second portion is defined from the upstream face of the turbine member to the outlet.

11. The system of claim 6, wherein the turbine shaft and the electric machine drive shaft are axially spaced.

12. The system of claim 11, wherein the clutch assembly is axially located between the turbine shaft and the electric machine drive shaft.

13. The system of claim 6, wherein a dome wall is disposed in the interior, wherein the dome wall is configured to guide air from the inlet to the turbine member.

14. A turbine engine comprising:

an engine core having a compression section, a combustion section, and a turbine in serial flow arrangement, the engine core having an engine drive shaft; and a system comprising:

an air turbine starter, the air turbine starter comprising:

a housing defining an interior;

a turbine member located within the interior and having a turbine shaft and a plurality of blades coupled to the turbine shaft;

an electric motor within the interior and having an electric machine drive shaft;

a clutch assembly within the interior and selectively coupling the turbine shaft to the electric machine drive shaft; and a primary air flow path coupling an inlet and an outlet, wherein the primary air flow path, the inlet, and the outlet are defined by at least a portion of the housing, and wherein at least a portion of the primary air flow path is further defined by an outer surface of the electric motor;

a valve selectively fluidly coupled to the inlet; and a controller operatively coupled to the valve.

15. The turbine engine of claim 14, wherein the valve is an ambient air valve, the system further including a pressurized air valve to, when opened, fluidly couple a pressurized air supply to the inlet, the system further including a starter air valve between the inlet and both of the ambient air valve and the pressurized air valve.

16. The turbine engine of claim 15, wherein the controller is operatively coupled to the starter air valve, the ambient air valve, and the pressurized air valve, wherein the controller is configured to actuate each of the starter air valve, the ambient air valve, and the pressurized air valve between a respective open position and a respective closed position.

17. The turbine engine of claim 14, wherein a dome wall is disposed in the interior, wherein the dome wall is configured to guide air from the inlet to the turbine member.

18. The turbine engine of claim 14, wherein the turbine shaft and the electric machine drive shaft are axially spaced.

19. The turbine engine of claim 18, wherein the clutch assembly is axially located between the turbine shaft and the electric machine drive shaft.

20. The turbine engine of claim 14, wherein the air turbine starter further comprises an output shaft coupled to the turbine shaft, wherein the output shaft is selectively coupled to the engine drive shaft.

* * * * *